US007239085B2

United States Patent
Kawamura (10) Patent No.: US 7,239,085 B2
(45) Date of Patent: Jul. 3, 2007

(54) PLASMA DISPLAY PANEL (75) Inventor: Hiroshi Kawamura, Tokyo (JP)

(73) Assignee: Pioneer Corporation, Tokyo (JP)

( * ) Notice: Subject to any disclaimer, the term of this patent is extended or adjusted under 35 U.S.C. 154(b) by 444 days.

(21) Appl. No.: 10/934,548

(22) Filed: Sep. 7, 2004

(65) Prior Publication Data
US 2005/0077810 A1   Apr. 14, 2005

(30) Foreign Application Priority Data
Oct. 8, 2003   (JP)   ............................ 2003-349749

(51) Int. Cl.
    *H01J 17/49* (2006.01)
(52) U.S. Cl. ...................... 313/582; 313/486
(58) Field of Classification Search ................ 313/581, 313/582, 586, 587, 486
    See application file for complete search history.

(56) References Cited

U.S. PATENT DOCUMENTS 6,794,821 B2 * 9/2004 Juestel et al. ............... 313/587

FOREIGN PATENT DOCUMENTS

JP   2001-84911 A    3/2001
JP   2002-332481 A   11/2002

* cited by examiner

Primary Examiner—Vip Patel
(74) Attorney, Agent, or Firm—Sughrue Mion, PLLC (57) ABSTRACT A plasma display panel includes a first substrate, and a second substrate facing the first substrate. The first substrate includes a transparent substrate, a scanning electrode and a common electrode both formed on the transparent substrate, and a dielectric layer covering the transparent substrate, the scanning electrode and the common electrode therewith. The second substrate includes an electrically insulating substrate, data electrodes formed on the electrically insulating substrate, partition walls formed on the electrically insulating substrate, and a phosphor layer covering the electrically insulating substrate and the data electrodes therewith between adjacent partition walls. The phosphor layer includes a blue-phosphor layer composed of phosphor which emits a blue light. The blue-phosphor layer is composed of a mixture of two or more phosphors each of which emits a blue light and has an initial brightness and variation of brightness with the lapse of time both different from one another.

27 Claims, 7 Drawing Sheets

PLASMA DISPLAY PANEL

BACKGROUND OF THE INVENTION

1. Field of the Invention

The invention relates to a plasma display panel, and more particularly to a phosphor layer as one of parts constituting a plasma display panel, in particular, a phosphor layer which emits a blue light.

2. Description of the Related Art

A plasma display panel (PDP) is recently popularized as a flat display because of its advantages that a plasma display panel is thin, a big screen can be readily fabricated with a plurality of plasma display panels, a plasma display panel has a broad viewing angle, and a plasma display panel has a high response speed.

Figure 1:
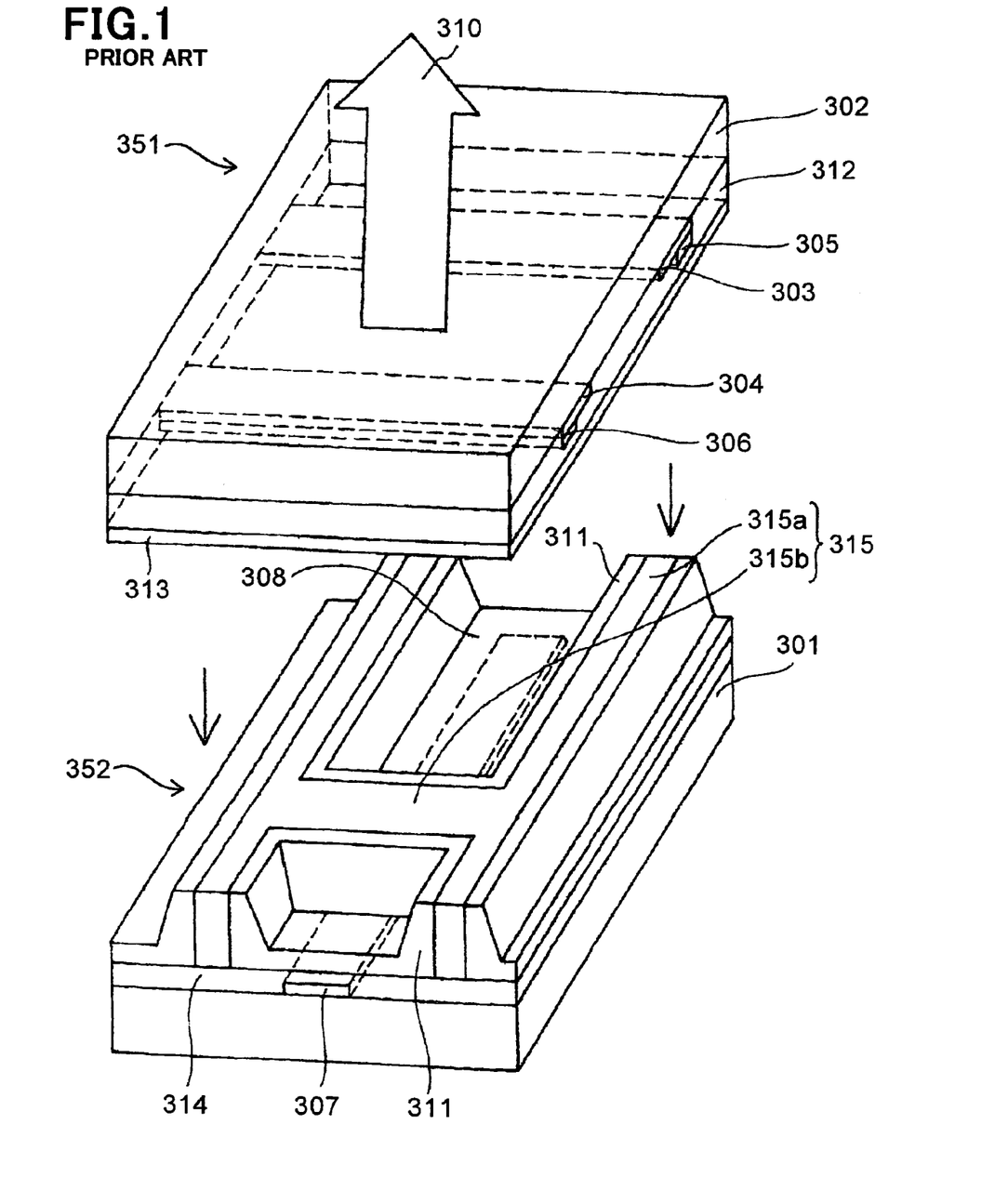
FIG. 1 is a perspective exploded view of a display cell in a conventional plasma display panel.

FIG. 1 is a perspective view of a display cell in a conventional three-electrode surface-discharge AC type plasma display panel 300.

As illustrated in FIG. 1, the display cell includes a front substrate 351 and a rear substrate 352 arranged in parallel with each other. In use of the plasma display panel 300, the front substrate 351 is directed to a viewer.

The front substrate 351 is comprised of an electrically insulating substrate 302 composed of transparent material such as glass, a plurality of scanning electrodes 303 and common electrodes 304 (only one of them is illustrated in FIG. 1) formed on a surface of the electrically insulating substrate 302 facing the rear substrate 352, trace electrodes 305 formed on the scanning electrodes 303, trace electrodes 306 formed on the common electrodes 304, a dielectric layer 312 formed on the electrically insulating substrate 302, covering the scanning electrodes 303, the common electrodes 304 and the trace electrodes 305 and 306 therewith, and a protection layer 313 formed on the dielectric layer 312.

The scanning and common electrodes 303 and 304 are alternately arranged and spaced away from each other by a certain distance in parallel with each other.

The trace electrodes 305 and 306 reduce electrical resistances of the scanning and common electrodes 303 and 304.

The protection layer 313 protects the dielectric layer 312 from discharges, and is composed of magnesium oxide (MgO), for instance.

The rear substrate 352 is comprised of an electrically insulating substrate 301 composed of transparent material such as glass, a plurality of data electrodes 307 (only one of them is illustrated in FIG. 1) formed on a surface of the electrically insulating substrate 301 facing the front substrate 351 such that the data electrodes 307 extend perpendicularly to the scanning and common electrodes 303 and 304, a dielectric layer 314 formed on the electrically insulating substrate 301, covering the data electrodes 307 therewith, a partition walls 315 formed on the dielectric layer 314, and a phosphor layer 311 formed on both an exposed surface of the dielectric layer 314 and sidewalls of the partition wall 315.

In the display cell illustrated in FIG. 1, through the rear substrate 352 is designed to include the transparent substrate 301, it is not always necessary for the electrically insulating substrate 301 to be transparent.

The partition wall 315 defines a discharge gas space and a display cell (a pixel) 308.

When viewed perpendicularly to the electrically insulating substrate 301, the partition wall 315 is in the form of a grid. The partition wall 315 is comprised of vertical partition walls 315a extending in parallel with the data electrodes 307, and horizontal partition walls 315b extending perpendicularly to the vertical partition walls 315a.

The vertical and horizontal partition walls 315a and 315b are equal in height to each other. A height of the vertical and horizontal partition walls 315a and 315b from a surface of the electrically insulating substrate 301, that is, a total thickness of the dielectric layer 314 and the partition wall 315 is 120 micrometers, for instance.

The display cell 308 is filled with a discharge gas composed of a mixture of helium, neon, xenon or other noble gases singly or in combination. The phosphor layer 311 receives ultra-violet rays resulted from discharge of the discharge gas, and resultingly, emits a visible light 310 towards a viewer.

Figure 2A:
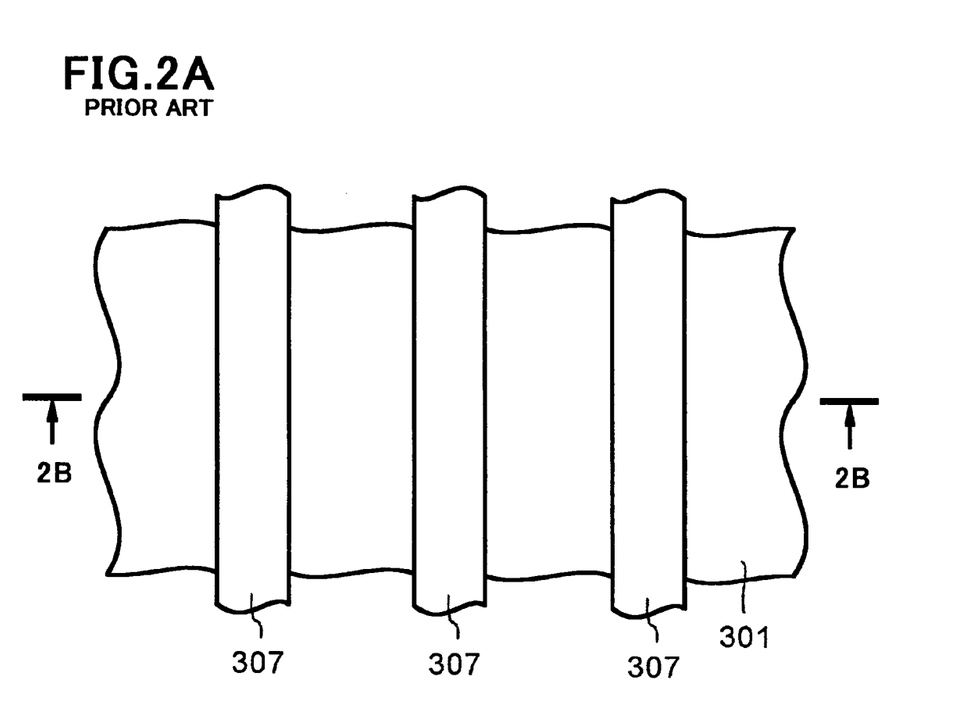
FIG. 2A is a cross-sectional view of a rear substrate, showing a step to be carried out in a method of fabricating the plasma display panel illustrated in FIG. 1.
Figure 2B:
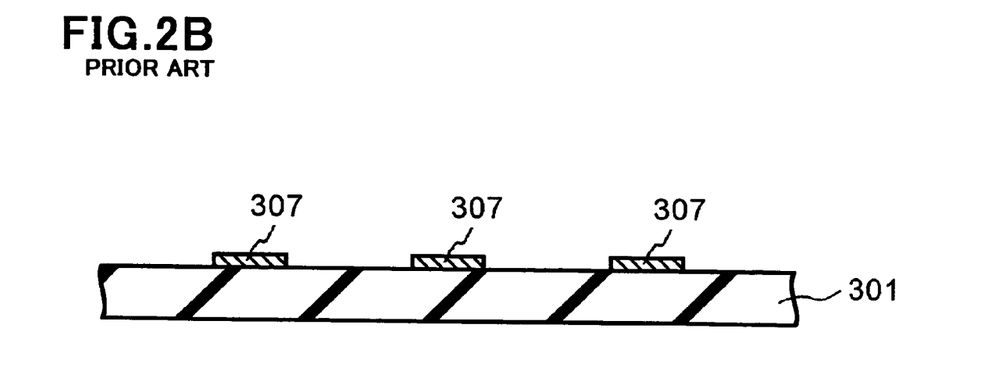
FIG. 2B is a cross-sectional view taken along the line 2B—2B in FIG. 2A.
Figure 2C:
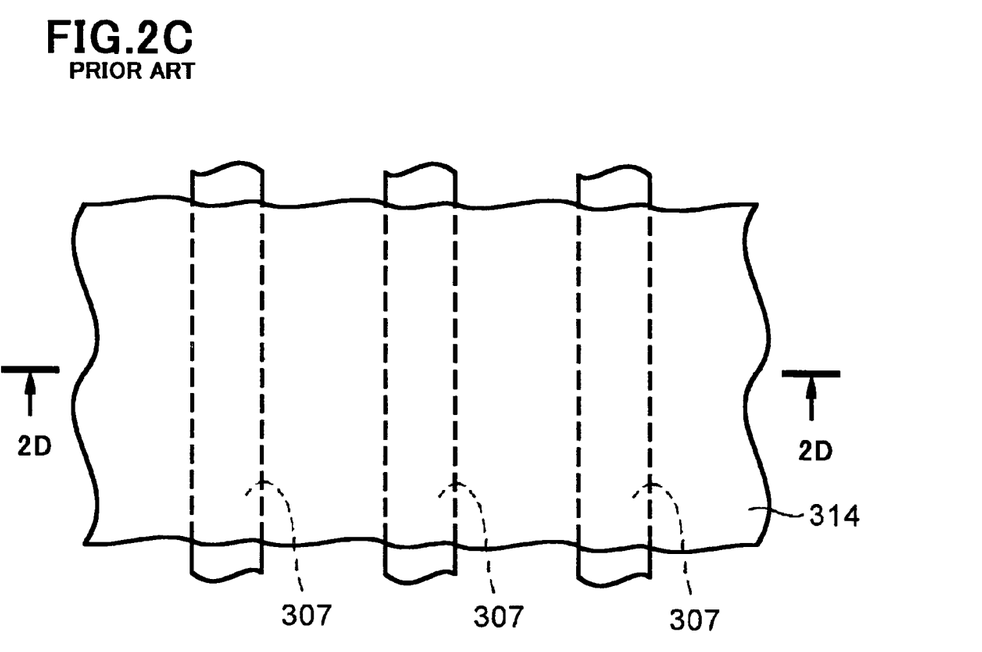
FIG. 2C is a cross-sectional view of a rear substrate, showing a step to be carried out in a method of fabricating the plasma display panel illustrated in FIG. 1.
Figure 2D:
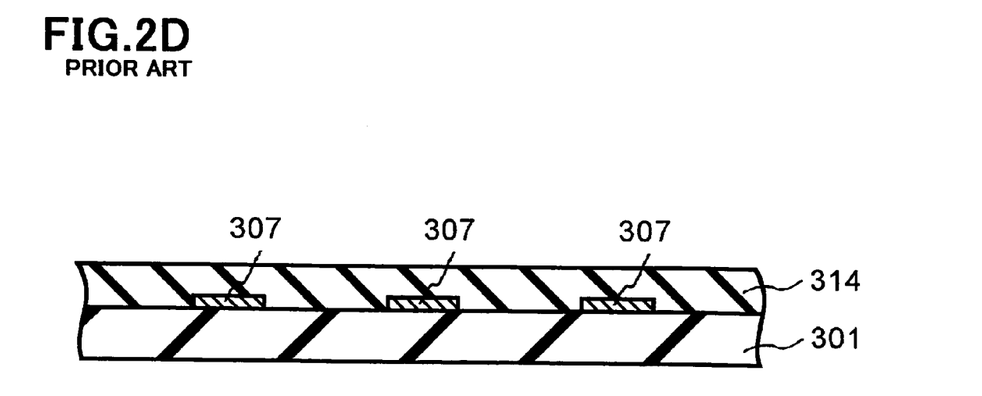
FIG. 2D is a cross-sectional view taken along the line 2B—2B in FIG. 2C.
Figure 2E:
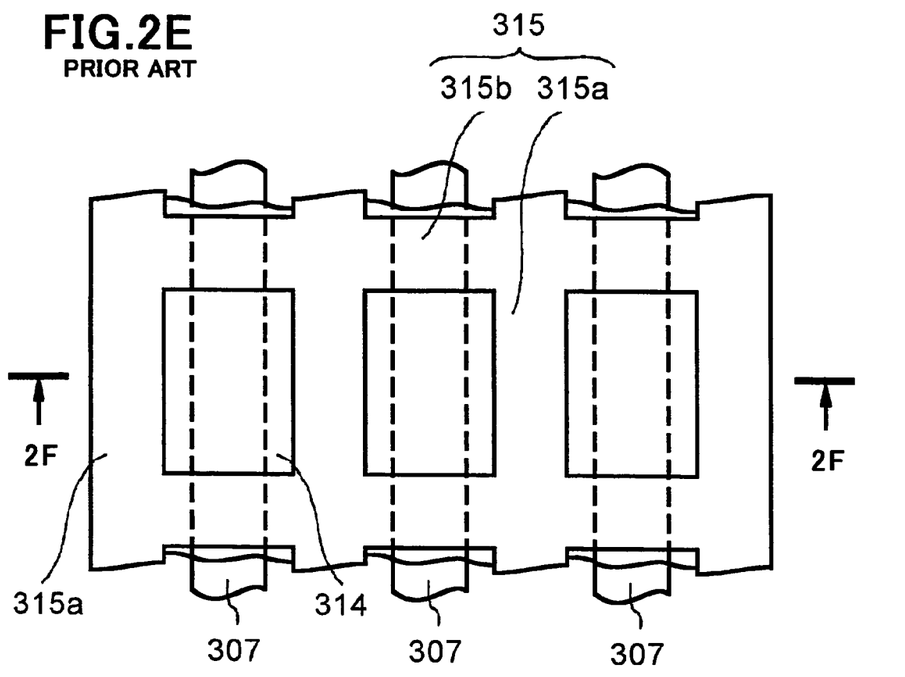
FIG. 2E is a cross-sectional view of a rear substrate, showing a step to be carried out in a method of fabricating the plasma display panel illustrated in FIG. 1.
Figure 2F:
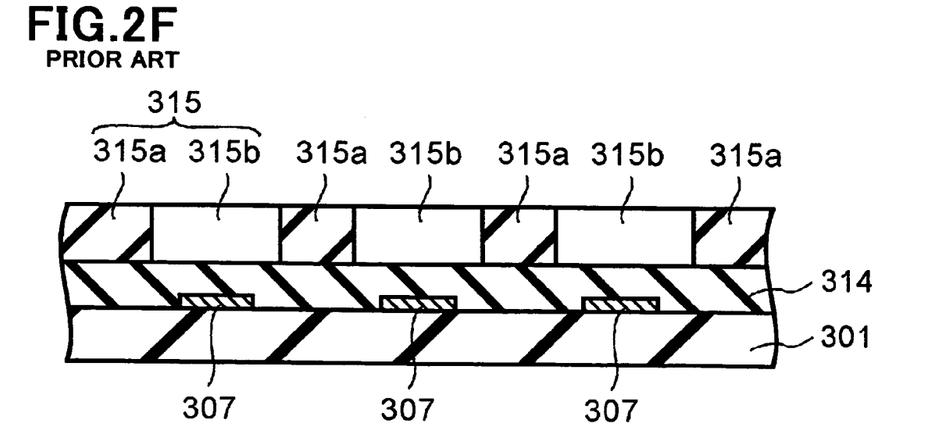
FIG. 2F is a cross-sectional view taken along the line 2B—2B in FIG. 2E.

FIGS. 2A to 2F illustrate steps to be carried out in a method of fabricating the plasma display panel 300. FIGS. 2A, 2C and 2E are plan views of the rear substrate 352, and FIGS. 2B, 2D and 2F are cross-sectional views taken along the lines 2B—2B, 2D—2D and 2F—2F in FIGS. 2A, 2C and 2E, respectively.

Hereinbelow is explained a method of fabricating the plasma display panel 300 with reference to FIGS. 2A to 2F.

As illustrated in FIG. 1, the scanning and common electrodes 303 and 304 are formed on the electrically insulating substrate 302 such that they are alternately arranged and extend in parallel with each other.

Then, the trace electrodes 305 and 306 are formed on the scanning and common electrodes 303 and 304, respectively.

Then, the dielectric layer 312 is deposited on the electrically insulating substrate 302 such that the scanning and common electrodes 303 and 304 and the trace electrodes 305 and 306 are fully covered with the dielectric layer 312.

Then, the protection layer composed of MgO is formed on the dielectric layer 312.

Thus, there is completed the front substrate 351.

With respect to the rear substrate 352, as illustrated in FIGS. 2A and 2B, a plurality of the data electrodes 307 are formed on the electrically insulating substrate 301 so that they extend in a common direction.

Then, as illustrated in FIGS. 2C and 2D, the dielectric layer 314 is formed on the electrically insulating substrate 301 so as to cover the data electrodes 307 therewith.

Then, as illustrated in FIGS. 2E and 2F, the partition wall 315 is formed on the dielectric layer 314.

The partition wall 315 may be formed by sand-blasting or printing. For instance, the partition wall 315 is formed by sand-blasting, as follows.

First, there is made partition-wall paste comprised of a mixture of filler, glass powder, binder and solution.

Then, the partition-wall paste is coated onto the dielectric layer 314. Then, solution contained in the partition-wall paste is evaporated. Thus, there is formed a paste layer (not illustrated).

Then, a dry film is adhesively put on the paste layer, and then, is patterned.

Then, the paste layer is sand-blasted with the thus patterned dry film being used as a mask. Thus, the paste layer is patterned in accordance with a pattern of the dry film.

Then, the dry film is removed, and the paste layer is baked.

Thus, binder contained in the paste layer is evaporated, and simultaneously, glass powder is melted and solidified again. As a result, there is formed the partition wall 315 composed of filler and glass.

The partition wall 315 is formed in the form of a grid such that the vertical and horizontal partition walls 315a and 315b are equal in height to each other.

Then, as illustrated in FIG. 1, the phosphor layer 311 is formed on an exposed surface of the dielectric layer 314 and sidewalls of the partition wall 315.

Thereafter, the electrically insulating substrate 301 is caused to overlap the electrically insulating substrate 302 such that the protection layer 313 formed on the electrically insulating substrate 302 makes contact with the partition wall 315 formed on the electrically insulating substrate 301, and that the data electrodes 307 extend perpendicularly to the scanning and common electrodes 305 and 304.

Then, thermal treatment is applied to the electrically insulating substrates 301 and 302 overlapping each other to thereby adhere them to each other at their ends by virtue of flits. Thus, a space defined by the electrically insulating substrates 301 and 302 and a seal layer (not illustrated) comprised of the flits is hermetically sealed.

Thereafter, the space is evacuated of air, and then, filled with discharge gas.

Thus, there is completed the plasma display panel 300 illustrated in FIG. 1.

When the plasma display panel 300 is fabricated as a color plasma display panel, RGB phosphor layers which emit red (R), green (G) and blue (B) lights are arranged in every three display cells. Specifically, a phosphor layer composed of phosphor which emits a red light, a phosphor layer composed of phosphor which emits a green light, and a phosphor layer composed of phosphor which emits a blue light are vertically and horizontally arranged in this order.

Among those three phosphor layers, a phosphor layer which emits a blue light is accompanied with a problem that an initial brightness and a lifetime collide with each other, and this problem remains unsolved. Specifically, if a phosphor layer emitting a blue light is composed of a material providing a desired initial brightness, the phosphor layer could not have a sufficient lifetime, and in contrast, if a phosphor layer emitting a blue light is composed of a material providing a desired lifetime, the phosphor layer could not have a sufficient initial brightness.

Hence, many attempts have been made to solve the above-mentioned problem in a phosphor layer emitting a blue light.

For instance, Japanese Patent Application Publication No. 2002-332481(A) has suggested phosphor composed of silicate and being excited by ultra-violet rays in vacuum condition, as a material of which a phosphor layer emitting a blue light is composed.

Specifically, the Publication suggests the phosphor composed of $mM^1O.nM^2O.2M^3O_2$ containing at least one of Eu and Mn as an additive, wherein $M^1$ indicates at least one of Ca, Sr and Ba, $M^2$ indicates at least one of Mg and Zn, $M^3$ indicates at least one of Si and Ge, m is equal to or greater than 0.5, but equal to or smaller than 3.5 ($0.5 \leq m \leq 3.5$), n is equal to or greater than 0.5, but equal to or smaller than 2.5 ($0.5 \leq m \leq 2.5$), and $M^1$ indicates at least two of Ca, Sr and Ba, or Sr, or Ba when m and n are equal to one (m=n=1).

Japanese Patent Application Publication No. 2001-84911 (A) has suggested a plasma display panel including a phosphor layer composed of a mixture of phosphors emitting different-colored lights.

Specifically, at least one of a phosphor layer emitting a red light, a phosphor layer emitting a green light, and a phosphor layer emitting a blue light is composed of a mixture of phosphor emitting a red, green or blue light and phosphor emitting a different-colored light.

The phosphor suggested in the firstly mentioned Publication has an advantage that variation in a brightness with the lapse of time is small, but is accompanied with a problem that an initial brightness is low.

The firstly mentioned Publication has an object of suppressing variation in a brightness wit the lapse of time, caused by thermal treatment or exposure to plasma. The object can be performed by selecting phosphor composed of silicate and excited by ultra-violet rays in vacuum condition, as a material of which a phosphor layer emitting a blue light is composed. However, the suggested phosphor is accompanied with a problem that it can suppress variation in a brightness wit the lapse of time, but it unavoidably sacrifices an initial brightness.

The secondly mentioned Publication has an object of controlling a color coordinate (color temperature) when a white light is to be emitted, that is, when red, green and blue lights are emitted. This object can be performed by composing a phosphor layer of a mixture of first phosphor emitting a certain color light, and second phosphor emitting another color light. However, the suggested plasma display panel is accompanied with a problem that a color degree is unavoidably reduced when a blue light is singly emitted.

SUMMARY OF THE INVENTION

In view of the above-mentioned problems in the conventional plasma display panels, it is an object of the present invention to provide a plasma display panel which is capable of suppressing variation in a brightness with the lapse of time without reduction in an initial brightness.

It is also an object of the present invention to provide a plasma display unit including the above-mentioned plasma display panel.

Hereinbelow is described a plasma display panel in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a plasma display panel comprising a first substrate (351) facing a viewer, and a second substrate (352) arranged in facing relation to the first substrate (351). The first substrate (351) is comprised of a transparent substrate (322), a scanning electrode (303) and a common electrode (304) both formed on the transparent substrate (302) in facing relation to the second substrate (352), and a dielectric layer (312) covering the transparent substrate (302), the scanning electrode (303) and the common electrode (304) therewith. The second substrate (352) is comprised of an electrically insulating substrate (301), a plurality of data electrodes (307) formed on the electrically insulating substrate (301), a plurality of partition walls (315) formed on the electrically insulating substrate (301), and a phosphor layer (311) covering the electrically insulating substrate (301) and the data electrodes (307) therewith between adjacent partition walls (315). The phosphor layer (311) includes at least a blue-phosphor layer composed of phosphor which emits a blue light. The blue-phosphor layer is composed of a mixture of two or more phosphors each of which emits a blue light and has an initial brightness and variation of brightness with the lapse of time both different from one another.

In the plasma display panel in accordance with the present invention, the blue-phosphor layer constituting the phosphor layer is comprised of a mixture of two or more phosphors which emit a blue light and which have initial brightnesses different from one another, and variations of a brightness with the lapse of time, different from one another.

Herein, variation of a brightness with the lapse of time is equivalent to a lifetime of a phosphor layer composed of phosphor which emits a blue light. That is, a phosphor layer having greater variation of a brightness with the lapse of time would have a shorter lifetime, and a phosphor layer having smaller variation of a brightness with the lapse of time would have a longer lifetime.

In general, an initial brightness collides with variation of a brightness with the lapse of time in a phosphor layer which emits a blue light. That is, a phosphor layer having a higher initial brightness would have greater variation of a brightness with the lapse of time, in other words, would have a shorter lifetime. In contrast, a phosphor layer having a lower initial brightness would have smaller variation of a brightness with the lapse of time, in other words, would have a longer lifetime. Accordingly, it would be possible to control both an initial brightness and variation of a brightness with the lapse of time by mixing at a predetermined ratio first phosphor having a high initial brightness and hence having great variation of a brightness with the lapse of time, and second phosphor having a low initial brightness and hence having small variation of a brightness with the lapse of time.

Two phosphors may be mixed with each other, or three or more phosphors may be mixed with one another.

For instance, the blue-phosphor layer may be composed of a mixture of first phosphor which emits a blue light and second phosphor which emits a blue light, the second phosphor having an initial brightness smaller than the same of the first phosphor, and smaller variation of brightness with the lapse of time than the same of the first phosphor.

By mixing such first and second phosphors with each other, it would be possible to have a phosphor layer emitting a blue light and having a desired initial brightness and desired variation of brightness with the lapse of time. A mixture ratio may be determined in dependence on a use. For instance, if an initial brightness is made much of, the first phosphor is mixed in a higher ratio than a ratio of the second phosphor. In contrast, if variation of brightness with the lapse of time is made much of, the second phosphor is mixed in a higher ratio than a ratio of the first phosphor.

It is preferable that the blue-phosphor layer includes the first phosphor in the range of 10 to 90 weight % both inclusive.

According to the results of the experiments having been carried out by the inventor, when the first and second phosphors are mixed to each other for composing a phosphor layer emitting a blue light, it is preferable that a mixture ratio of the first phosphor is in the range of 10 to 90 weight % relative to a weight of the phosphor layer (accordingly, a mixture ratio of the second phosphor is in the range of 10 to 90 weight % relative to a weight of the phosphor layer). By setting a mixture ratio of the first phosphor in the range of 10 to 90 weight %, it would be possible to have a desired initial brightness and variation of brightness with the lapse of time.

For instance, there may be selected phosphor which emits a blue light and includes aluminate having bivalent europium ($Eu^{2+}$), as the first phosphor. As phosphor which emits a blue light and includes aluminate having bivalent europium ($Eu^{2+}$), there may be selected $BaMgAl_{10}O_{17}:Eu^{2+}$, $BaMgAl_{12}O_{19}:Eu^{2+}$ or $BaMgAl_{14}O_{23}:Eu^{2+}$, for instance.

For instance, there may be selected phosphor which emits a blue light and includes silicate having bivalent europium ($Eu^{2+}$), as the second phosphor. As phosphor which emits a blue light and includes silicate having bivalent europium ($Eu^{2+}$), there may be selected $CaMgSi_2O_6:Eu^{2+}$ or $CaSrMgSi_2O_6:Eu^{2+}$, for instance.

The first phosphor may be selected one or more among phosphors which emit a blue light and include aluminate having bivalent europium ($Eu^{2+}$).

Similarly, the second phosphor may be selected one or more among phosphors which emit a blue light and include silicate having bivalent europium ($EU^{2+}$).

When the first and second phosphor layers are designed to be comprised of two or more phosphors emitting a blue light, it is preferable that the phosphors are in the range of 10 to 90 weight % both inclusive relative to a weight of the blue-phosphor layer.

When the first and second phosphor layers are designed to be comprised of two or more phosphors emitting a blue light, it is preferable that one of the phosphors is $BaMgAl_{10}O_{17}:Eu^{2+}$ or $CaMgSi_2O_6:Eu^{2+}$.

In another aspect of the present invention, there is provided a plasma display unit including the above-mentioned plasma display panel as a display panel.

There is further provided a plasma display unit including an analog interface which converts a received analog image signal into a digital image signal, and outputs the digital image signal, and a plasma display module including the above-mentioned plasma display panel for outputting mages in accordance with the digital image signal received from the analog interface.

The advantages obtained by the aforementioned present invention will be described hereinbelow.

In general, an initial brightness collides with variation of a brightness with the lapse of time in a phosphor layer which emits a blue light. That is, a phosphor layer having a higher initial brightness would have greater variation of a brightness with the lapse of time, in other words, would have a shorter lifetime. In contrast, a phosphor layer having a lower initial brightness would have smaller variation of a brightness with the lapse of time, in other words, would have a longer lifetime. Accordingly, it would be possible to control both an initial brightness and variation of a brightness with the lapse of time by mixing at a predetermined ratio first phosphor having a high initial brightness and hence having great variation of a brightness with the lapse of time, and second phosphor having a low initial brightness and hence having small variation of a brightness with the lapse of time.

Thus, in a plasma display panel or a plasma display unit, if an initial brightness is made much of, the first phosphor is mixed in a higher ratio than a ratio of the second phosphor. In contrast, if variation of brightness with the lapse of time is made much of, the second phosphor is mixed in a higher ratio than a ratio of the first phosphor. By controlling a mixture ratio of the first and second phosphors, it would be possible to have a blue-light emitting phosphor layer having a desired initial brightness and desired variation of a brightness with the lapse of time.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

A phosphor layer emitting a blue light in accordance with the first embodiment of the present invention was comprised of a mixture of first phosphor emitting a blue light, and having a relatively high initial brightness and relatively great variation of a brightness with the lapse of time, and second phosphor emitting a blue light, and having a lower initial brightness than the same of the first phosphor and smaller variation of a brightness with the lapse of time than the same of the first phosphor.

As the first phosphor, there was selected $BaMgAl_{10}O_{17}$:$Eu^{2+}$ (hereinafter, referred to as "BAM") among phosphors which emit a blue light and include aluminate having bivalent europium ($Eu^{2+}$), and as the second phosphor, there was selected $CaMgSi_2O_6$:$Eu^{2+}$ (hereinafter, referred to as "CMS") among phosphors which emit a blue light and include silicate having bivalent europium ($Eu^{2+}$).

There was made a mixture of BAM at 90 weight % and CMS at 10 weight %. The blue-light emitting phosphor layer in accordance with the first embodiment was composed of the mixture.

Hereinbelow is explained a method of fabricating the blue-light emitting phosphor layer.

First, BAM, CMS and a solution was mixed with one another to thereby make phosphor paste. The solution mainly contains BCA (Butyl Carbitol Acetate) including resin such as ethyl cellulose.

Then, the phosphor paste is coated by screen-printing or through the use of a dispenser onto an exposed surface of the dielectric layer 314 and sidewalls of the partition wall 315 both formed on the electrically insulating substrate 301 of the rear substrate 352.

Then, the phosphor paste is dried and baked. As a result, there is formed the blue-light emitting phosphor layer 311 having a thickness of about 10 micrometers.

Hereinafter, there is fabricated a plasma display panel including the blue-light emitting phosphor layer in accordance with the first embodiment, in accordance with the method of fabricating the plasma display panel illustrated in FIG. 1.

A predetermined drive voltage was applied to the plasma display panel including the thus fabricated blue-light emitting phosphor layer in accordance with the first embodiment, to cause the blue-light emitting phosphor layer to emit a blue light. After the plasma display panel has been driven continuously for 1000 hours, a brightness of a blue light emitted from the blue-light emitting phosphor layer was measured.

Table 1 shows the results of the measurement.

TABLE 1

| | BAM | CMS | Before 1000-hour Operation | | After 1000-hour Operation | |
|---|---|---|---|---|---|---|
| required characteristic | mixture ratio | mixture ratio | Initial Brightness 100 or higher | Estimate | Brightness 80 or higher | Estimate |
| BAM | 100 wt % | 0 wt % | 125 | ○ | 78 | X |
| CMS | 0 wt % | 100 wt % | 98 | X | 96 | ○ |
| First Embodiment | 90 wt % | 10 wt % | 124 | ○ | 82 | ○ |

(Brightnesses are expressed in a unit of [$cd/m^2$].

A threshold for an initial brightness was set equal to 100 $cd/m^2$, and a threshold for a brightness after continuous 1000-hour operation was set equal to 80 $cd/m^2$. Specifically, if a brightness measured after the plasma display panel has been driven continuously for 1000 hours was reduced by more than 20%, the estimate was "No good" (X), and if a brightness measured after the plasma display panel has been driven continuously for 1000 hours was reduced by 20% or smaller, the estimate was "Good" (○).

As shown in Table 1, the blue-light emitting phosphor layer composed singly of BAM had an initial brightness of 125, and a brightness of 78 measured after the plasma display panel has been driven continuously for 1000 hours. Thus, the blue-light emitting phosphor layer composed singly of BAM could have an initial brightness higher than a target initial brightness of 100 $cd/m^2$, but could not have a target brightness of 80 $cd/m^2$ to be measured after the plasma display panel has been driven continuously for 1000 hours.

As shown in Table 1, the blue-light emitting phosphor layer composed singly of CMS had an initial brightness of 98, and a brightness of 96 measured after the plasma display panel has been driven continuously for 1000 hours. Thus, the blue-light emitting phosphor layer composed singly of CMS could have brightness higher than a target brightness of 80 $cd/m^2$ to be measured after the plasma display panel has been driven continuously for 1000 hours, but could not have a target initial brightness of 100 cd/m².

In contrast, the blue-light emitting phosphor layer comprised of a mixture of BAM at 90 weight % and CMS at 10 weight %, in accordance with the first embodiment, had an initial brightness of 124 cd/m² and a brightness of 82 cd/m² to be measured after the plasma display panel has been driven continuously for 1000 hours. That is, the blue-light emitting phosphor layer in accordance with the first embodiment could have both a target initial brightness of 100 cd/m² and a target brightness of 80 cd/m² to be measured after the plasma display panel has been driven continuously for 1000 hours.

Thus, it was found out that the blue-light emitting phosphor layer in accordance with the first embodiment has desired characteristics with respect to both an initial brightness and variation of a brightness with the lapse of time.

[Second Embodiment]

A blue-light emitting phosphor layer in accordance with the second embodiment was comprised of a mixture of BAM at 80 weight % and CMS at 20 weight %. The measurement was made in the same way as the first embodiment.

Table 2 shows the results of the measurement.

TABLE 2

| required characteristic | BAM mixture ratio | CMS mixture ratio | Before 1000-hour Operation Initial Brightness 100 or higher | Estimate | After 1000-hour Operation Brightness 80 or higher | Estimate |
|---|---|---|---|---|---|---|
| BAM | 100 wt % | 0 wt % | 125 | ○ | 78 | X |
| CMS | 0 wt % | 100 wt % | 98 | X | 96 | ○ |
| Second Embodiment | 80 wt % | 20 wt % | 122 | ○ | 83 | ○ |

(Brightnesses are expressed in a unit of [cd/m²].

As shown in Table 2, the blue-light emitting phosphor layer comprised of a mixture of BAM at 80 weight % and CMS at 20 weight %, in accordance with the second embodiment, had an initial brightness of 122 cd/m² and a brightness of 83 cd/m² to be measured after the plasma display panel has been driven continuously for 1000 hours. That is, the blue-light emitting phosphor layer in accordance with the second embodiment could have both a target initial brightness of 100 cd/m² and a target brightness of 80 cd/m² to be measured after the plasma display panel has been driven continuously for 1000 hours.

Thus, it was found out that the blue-light emitting phosphor layer in accordance with the second embodiment has desired characteristics with respect to both an initial brightness and variation of a brightness with the lapse of time.

[Third Embodiment]

A blue-light emitting phosphor layer in accordance with the third embodiment was comprised of a mixture of BAM at 50 weight % and CMS at 50 weight %. The measurement was made in the same way as the first embodiment.

Table 3 shows the results of the measurement.

TABLE 3

| required characteristic | BAM mixture ratio | CMS mixture ratio | Before 1000-hour Operation Initial Brightness 100 or higher | Estimate | After 1000-hour Operation Brightness 80 or higher | Estimate |
|---|---|---|---|---|---|---|
| BAM | 100 wt % | 0 wt % | 125 | ○ | 78 | X |
| CMS | 0 wt % | 100 wt % | 98 | X | 96 | ○ |
| Third Embodiment | 50 wt % | 50 wt % | 115 | ○ | 88 | ○ |

(Brightnesses are expressed in a unit of [cd/m²].

As shown in Table 3, the blue-light emitting phosphor layer comprised of a mixture of BAM at 50 weight % and CMS at 50 weight %, in accordance with the third embodiment, had an initial brightness of 115 cd/m² and a brightness of 88 cd/m² to be measured after the plasma display panel has been driven continuously for 1000 hours. That is, the blue-light emitting phosphor layer in accordance with the third embodiment could have both a target initial brightness of 100 cd/m² and a target brightness of 80 cd/m² to be measured after the plasma display panel has been driven continuously for 1000 hours.

Thus, it was found out that the blue-light emitting phosphor layer in accordance with the third embodiment has desired characteristics with respect to both an initial brightness and variation of a brightness with the lapse of time.

[Fourth Embodiment]

A blue-light emitting phosphor layer in accordance with the fourth embodiment was comprised of a mixture of BAM at 30 weight % and CMS at 70 weight %. The measurement was made in the same way as the first embodiment.

Table 4 shows the results of the measurement.

TABLE 4

|  | BAM mixture ratio required | CMS mixture ratio characteristic | Before 1000-hour Operation Initial Brightness 100 or higher | Estimate | After 1000-hour Operation Brightness 80 or higher | Estimate |
|---|---|---|---|---|---|---|
| BAM | 100 wt % | 0 wt % | 125 | ○ | 78 | X |
| CMS | 0 wt % | 100 wt % | 98 | X | 96 | ○ |
| Fourth Embodiment | 30 wt % | 70 wt % | 110 | ○ | 90 | ○ |

(Brightnesses are expressed in a unit of [cd/m²].)

As shown in Table 4, the blue-light emitting phosphor layer comprised of a mixture of BAM at 30 weight % and CMS at 70 weight %, in accordance with the fourth embodiment, had an initial brightness of 110 cd/m² and a brightness of 90 cd/m² to be measured after the plasma display panel has been driven continuously for 1000 hours. That is, the blue-light emitting phosphor layer in accordance with the fourth embodiment could have both a target initial brightness of 100 cd/m² and a target brightness of 80 cd/m² to be measured after the plasma display panel has been driven continuously for 1000 hours.

Thus, it was found out that the blue-light emitting phosphor layer in accordance with the fourth embodiment has desired characteristics with respect to both an initial brightness and variation of a brightness with the lapse of time.

[Fifth Embodiment]

A blue-light emitting phosphor layer in accordance with the fifth embodiment was comprised of a mixture of BAM at 10 weight % and CMS at 90 weight %. The measurement was made in the same way as the first embodiment.

Table 5 shows the results of the measurement.

TABLE 5

|  | BAM mixture ratio required | CMS mixture ratio characteristic | Before 1000-hour Operation Initial Brightness 100 or higher | Estimate | After 1000-hour Operation Brightness 80 or higher | Estimate |
|---|---|---|---|---|---|---|
| BAM | 100 wt % | 0 wt % | 125 | ○ | 78 | X |
| CMS | 0 wt % | 100 wt % | 98 | X | 96 | ○ |
| Fifth Embodiment | 10 wt % | 90 wt % | 102 | ○ | 92 | ○ |

(Brightnesses are expressed in a unit of [cd/m²].)

As shown in Table 5, the blue-light emitting phosphor layer comprised of a mixture of BAM at 10 weight % and CMS at 90 weight %, in accordance with the fifth embodiment, had an initial brightness of 110 cd/m² and a brightness of 90 cd/m² to be measured after the plasma display panel has been driven continuously for 1000 hours. That is, the blue-light emitting phosphor layer in accordance with the fifth embodiment could have both a target initial brightness of 100 cd/m² and a target brightness of 80 cd/m² to be measured after the plasma display panel has been driven continuously for 1000 hours.

Thus, it was found out that the blue-light emitting phosphor layer in accordance with the fifth embodiment has desired characteristics with respect to both an initial brightness and variation of a brightness with the lapse of time.

Figure 3:
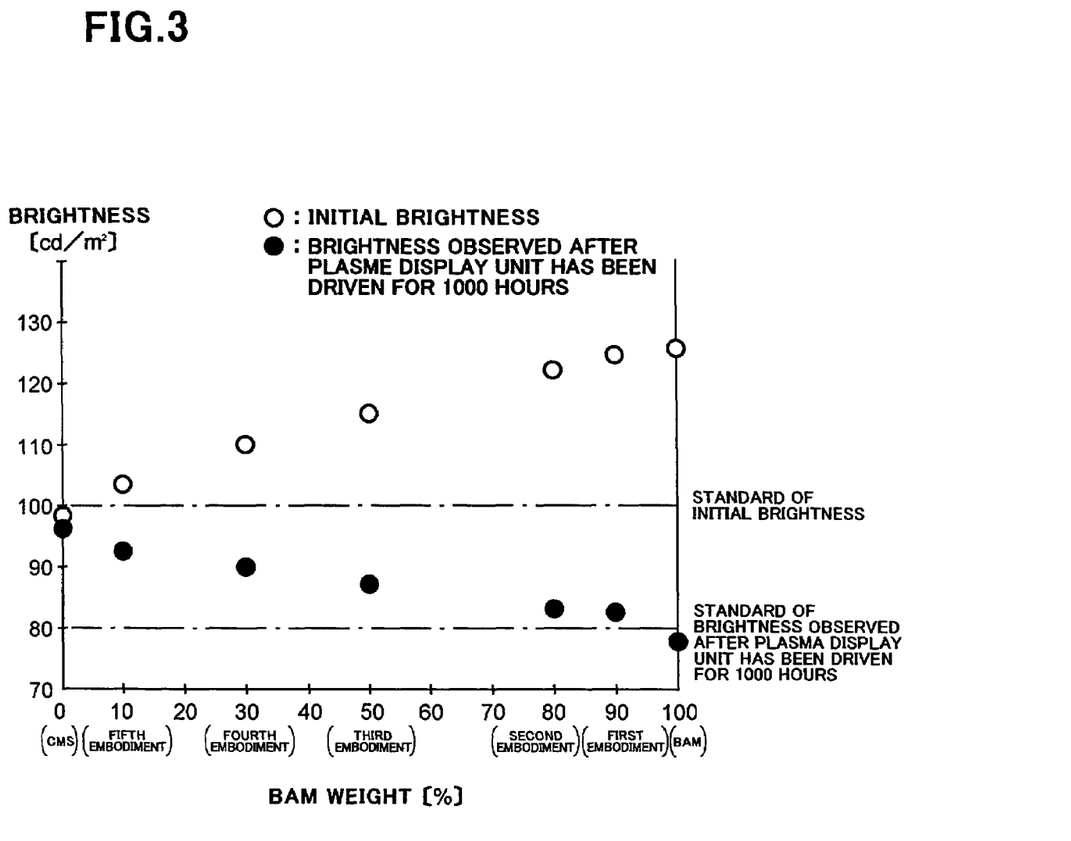
FIG. 3 is a graph showing brightness characteristics of the first to fifth embodiments.

FIG. 3 is a graph showing an initial brightness (○) and a brightness (●) observed after the plasma display panel has been driven continuously for 1000 hours in each of the blue-light emitting phosphor layer composed only of BAM, the blue-light emitting phosphor layer composed only of CMS, and the blue-light emitting phosphor layers in accordance with the first and fifth embodiments.

As is obvious in view of FIG. 3, if a weight ratio of BAM relative to a total weight of a blue-light emitting phosphor layer is in the range of 10 to 90 weight % (that is, a weight ratio of CMS is in the range of 90 to 10 weight %), it is possible to have a blue-light emitting phosphor layer having desired characteristics with respect to an initial brightness and variation of a brightness with the lapse of time.

[Sixth Embodiment]

In the above-mentioned first to fifth embodiments, as the first phosphor, there was selected $BaMgAl_{10}O_{17}:Eu^{2+}$ (BAM) among phosphors which emit a blue light and include aluminate having bivalent europium ($Eu^{2+}$), and as the second phosphor, there was selected $CaMgSi_2O_6:Eu^{2+}$ (CMS) among phosphors which emit a blue light and include silicate having bivalent europium ($Eu^{2+}$). Namely, each of the first and second phosphors is composed of single blue-light emitting phosphor.

However, phosphor to be selected as the first or second phosphor is not to be limited to single phosphor. Two or more phosphor may be selected as the first or second phosphor.

An example of the first phosphor comprised a plurality of phosphors is explained hereinbelow as the sixth embodiment.

In the sixth embodiment, as the first phosphor, there were selected two phosphors, namely, $BaMgAl_{10}O_{17}:Eu^{2+}$ and $BaMgAl_{14}O_{23}:Eu^{2+}$ among phosphors which emit a blue light and include aluminate having bivalent europium ($Eu^{2+}$), and as the second phosphor, there was selected $CaMgSi_2O_6:Eu^{2+}$ (CMS) among phosphors which emit a blue light and include silicate having bivalent europium ($Eu^{2+}$).

Similarly to the first to fifth embodiments, there were made six examples 1 to 6 each including $BaMgAl_{10}O_{17}:Eu^{2+}$ and $BaMgAl_{14}O_{23}:Eu^{2+}$ at 100, 90, 80, 50, 30 and 10 weight %, respectively, relative to a total weight of a blue-light emitting phosphor layer. Then, the measurement was made for each the examples 1 to 6 in the same way as the first embodiment.

Each of the examples 1 to 6 contains $BaMgAl_{10}O_{17}:Eu^{2+}$ at 60 weight %, and $BaMgAl_{14}O_{23}:Eu^{2+}$ at 40 weight %.

Table 6 shows the results of the measurement.

TABLE 6

| | BAM mixture ratio | CMS mixture ratio | Before 1000-hour Operation | | After 1000-hour Operation | |
|---|---|---|---|---|---|---|
| required characteristic | | | Initial Brightness 100 or higher | Estimate | Brightness 80 or higher | Estimate |
| Example 1 (BAM) | 100 wt % | 0 wt % | 125 | ○ | 78 | X |
| Example 2 | 90 wt % | 10 wt % | 122 | ○ | 81 | ○ |
| Example 3 | 80 wt % | 20 wt % | 120 | ○ | 82 | ○ |
| Example 4 | 50 wt % | 50 wt % | 113 | ○ | 85 | ○ |
| Example 5 | 30 wt % | 70 wt % | 107 | ○ | 90 | ○ |
| Example 6 | 10 wt % | 90 wt % | 102 | ○ | 93 | ○ |
| CMS | 0 wt % | 100 wt % | 98 | X | 96 | ○ |

(Brightnesses are expressed in a unit of [cd/m²].

Figure 4:
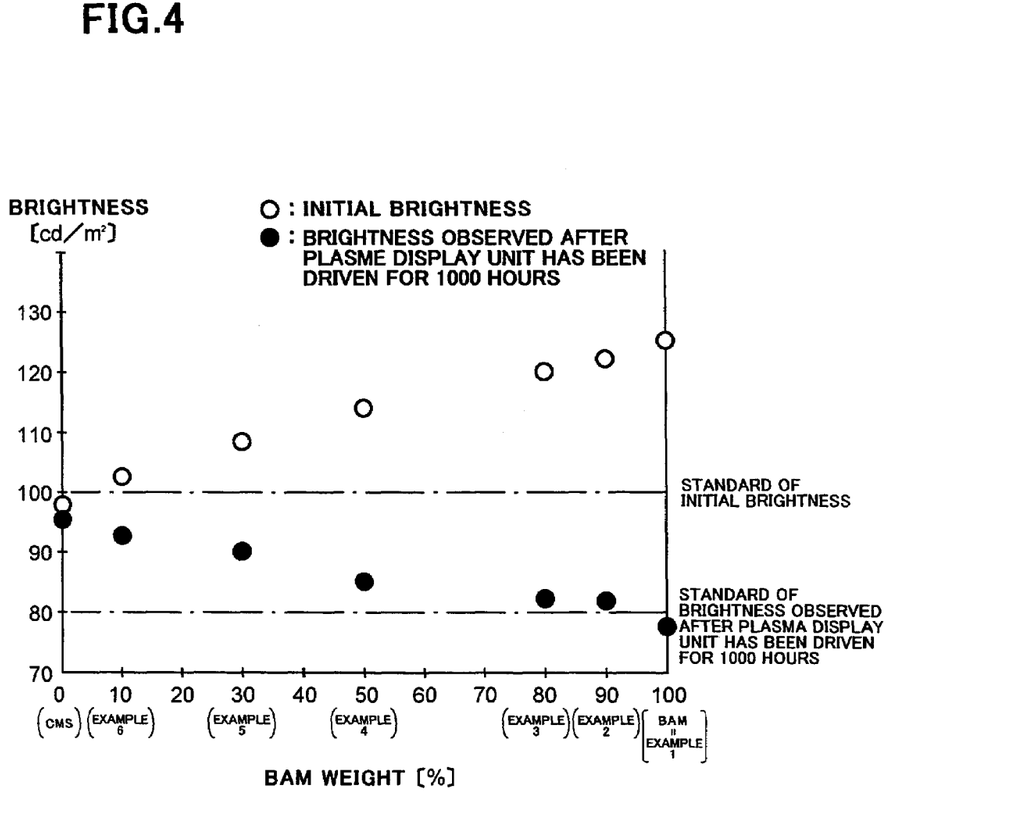
FIG. 4 is a graph showing brightness characteristics of the sixth embodiment.

FIG. 4 is a graph showing the results of Table 6. That is, FIG. 4 shows an initial brightness (○) and a brightness (●) observed after the plasma display panel has been driven continuously for 1000 hours in each of the examples 1 to 6 and the blue-light emitting phosphor composed only of CMS.

As shown in Table 6, the blue-light emitting phosphor layer (example 1) comprised of a mixture of $BaMgAl_{10}O_{17}:Eu^{2+}$ and $BaMgAl_{14}O_{23}:Eu^{2+}$ had an initial brightness of 125 cd/m² and a brightness of 78 cd/m² to be measured after the plasma display panel has been driven continuously for 1000 hours.

That is, the blue-light emitting phosphor layer in accordance with the example 1 could have a target initial brightness of 100 cd/m², but could not have a target brightness of 80 cd/m² to be measured after the plasma display panel has been driven continuously for 1000 hours.

In contrast, the blue-light emitting phosphor layers (examples 2 to 6) comprised of a mixture of $BaMgAl_{10}O_{17}:Eu^{2+}$ and $BaMgAl_{14}O_{23}:Eu^{2+}$ at 10 to 90 weight % and CMS at 90 to 10 weight % had an initial brightness of 122, 120, 113, 107 and 102 cd/m², respectively, and a brightness of 81, 82, 85, 90 and 93 cd/m², respectively, to be measured after the plasma display panel has been driven continuously for 1000 hours. That is, the blue-light emitting phosphor layers in accordance with the examples 2 to 6 could have both a target initial brightness of 100 cd/m² and a target brightness of 80 cd/m² to be measured after the plasma display panel has been driven continuously for 1000 hours.

Thus, it was found out that the blue-light emitting phosphor layers in accordance with the examples 2 to 6 have desired characteristics with respect to both an initial brightness and variation of a brightness with the lapse of time, similarly to the above-mentioned first to fifth embodiments.

As is obvious in light of the sixth embodiment, the first phosphor may be comprised of two or more blue-light emitting phosphors selected among phosphors which emit a blue light and include aluminate having bivalent europium ($Eu^{2+}$). Similarly, the second phosphor may be comprised of two or more blue-light emitting phosphors selected among phosphors which emit a blue light and include silicate having bivalent europium ($Eu^{2+}$).

When a blue-light emitting phosphor layer is comprised of two or more blue-light emitting phosphors, a total weight of the blue-light emitting phosphors is set in the range of 10 to 90 weight % both inclusive relative to a weight of a blue-light emitting phosphor layer.

In the above-mentioned first to sixth embodiments, $BaMgAl_{10}O_{17}:Eu^{2+}$ and $BaMgAl_{14}O_{23}:Eu^{2+}$ were used as blue-light emitting phosphor selected from phosphors which emit a blue light and include aluminate having bivalent europium ($Eu^{2+}$). However, it should be noted that another phosphor may be selected from phosphors which emit a blue light and include aluminate having bivalent europium ($Eu^{2+}$). For instance, as blue-light emitting phosphor, there may be selected $BaMgAl_{20}$ μg:$Eu^{2+}$.

In the above-mentioned first to sixth embodiments, $CaMgSi_2O_6:Eu^{2+}$ (CMS) was used as blue-light emitting phosphor selected from phosphors which emit a blue light and include silicate having bivalent europium ($Eu^{2+}$). However, it should be noted that another phosphor may be selected from phosphors which emit a blue light and include silicate having bivalent europium ($Eu^{2+}$). For instance, there may be selected $CaSrMgSi_2O_6:Eu^{2+}$.

The blue-light emitting phosphor layer in accordance with the first to sixth embodiments is used as a part of a plasma display panel or a part of a plasma display unit.

[Seventh Embodiment]

In the seventh embodiment, there is explained an example of a plasma display unit including a plasma display panel including a blue-light emitting phosphor layer in accordance with one of the first to fifth embodiments and the examples 2 to 6 in the sixth embodiments.

Figure 5:
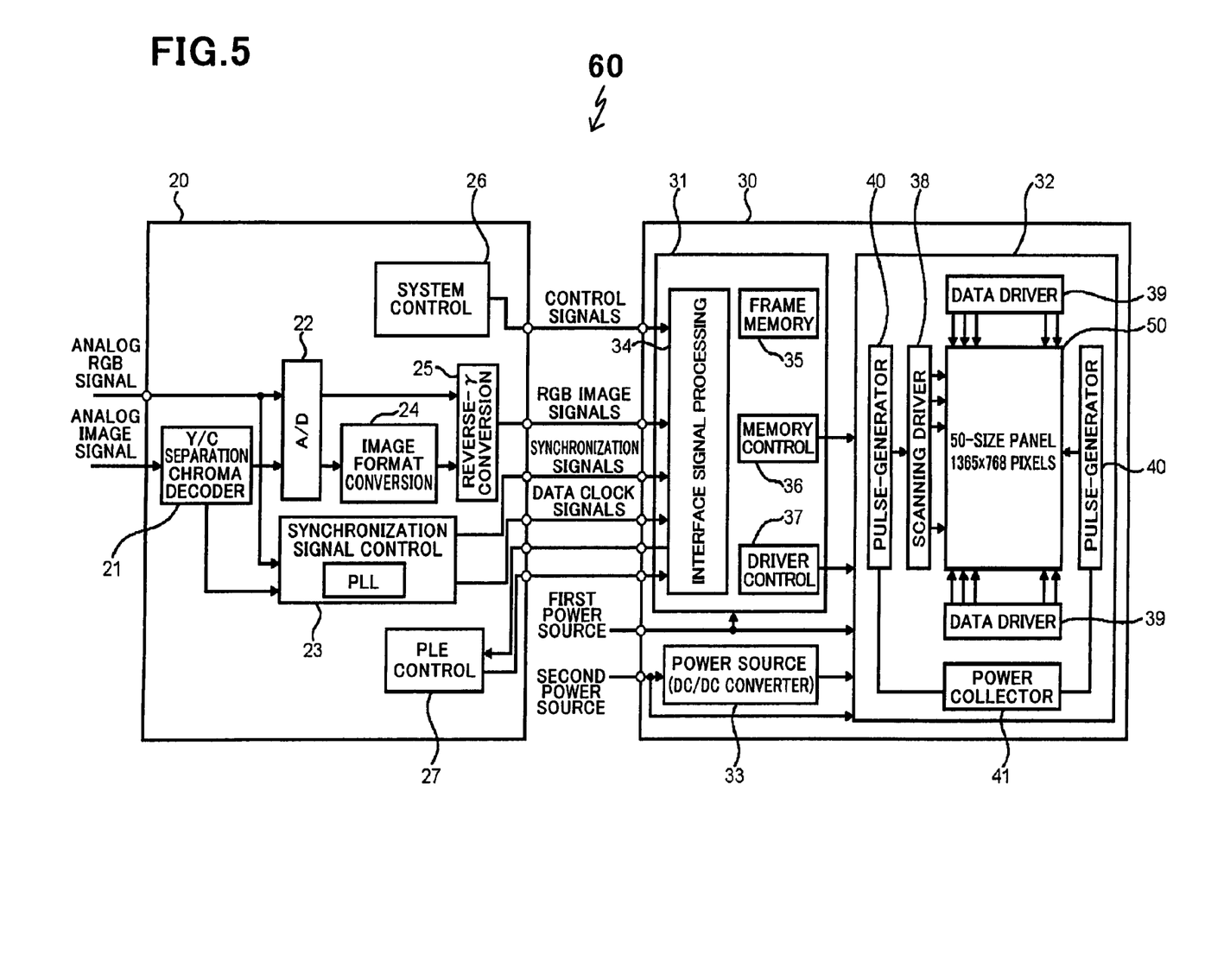
FIG. 5 is a block diagram of a plasma display unit in accordance with the seventh embodiment.

FIG. 5 is a block diagram of a plasma display unit 60 including a plasma display panel including the blue-light emitting phosphor layer.

As illustrated in FIG. 5, the plasma display unit 60 has a modularized structure. Specifically, the plasma display unit 60 is comprised of an analog interface 20 and a plasma display module 30.

The analog interface 20 is comprised of a Y/C separating circuit 21 including a chroma-decoder, an analog-digital (A/D) converting circuit 22, a circuit 23 for controlling a synchronization signal, including a phase-lock loop (PLL) circuit, a circuit 24 for converting an image format, an reverse-gamma converting circuit 25, a system control circuit 26, and a PLE control circuit 27.

In brief, the analog interface 20 coverts a received analog image signal into a digital image signal, and then, outputs the digital image signal to the plasma display module 30.

For instance, an analog image signal transmitted from a television tuner (not illustrated) is separated into luminance signals for RGB colors in the Y/C separating circuit 21, and then, converted into a digital signal in the A/D converting circuit 22.

Then, if a pixel configuration in the plasma display module 30 is different from a pixel configuration of the image signal, necessary conversion is carried out in the image-format converting circuit 24.

A characteristic of a luminance to a signal input to a plasma display panel is linear. Image signals are usually compensated for, specifically, gamma-converted in advance in accordance with characteristics of a cathode ray tube (CRT). Hence, after the image signals are A/D-converted in the A/D converting circuit 22, reverse-gamma conversion is applied to the image signals are in the reverse-gamma converting circuit 25 for producing digital image signals having linear characteristics. The digital image signals are output to the plasma display module 30 as RGB image signals.

Since an analog image signal does not include a sampling clock signal and a data clock signal used for A/D conversion, the PLL circuit included in the control circuit 23 produces a sampling clock signal and a data clock signal, based on a horizontal synchronization signal provided together with the analog image signal, and outputs the clock signals to the plasma display module 30.

The PLE control circuit 27 carries out luminance control. Specifically, if an average picture level is equal to or smaller than a threshold level, a luminance for displayed images is raised, and if an average picture level is greater than a threshold level, a luminance is reduced.

The system control circuit 26 outputs various control signals to the plasma display module 30.

The plasma display module 30 is comprised of a digital signal processing and controlling circuit 31, a panel section 32, and a power source circuit 33 including a DC/DC converter.

The digital signal processing and controlling circuit 31 is comprised of an interface signal processing circuit 34, a frame memory 35, a memory control circuit 36, and a driver control circuit 37.

The interface signal processing circuit 34 receives various control signals transmitted from the system control circuit 26, an RGB image signal transmitted from the reverse-gamma converting circuit 25, a synchronization signal transmitted from the control circuit 23, and a data clock signal transmitted from the PLL circuit.

For instance, an average picture level (APL) of an image signal input into the interface signal processing circuit 34 is calculated in an APL calculating circuit (not illustrated) included in the interface signal processing circuit 34, and output as 5-bit data, for instance. The PLE control circuit 27 arranges PLE control data in accordance with the calculated average picture level, and outputs the PLE control data to a picture level control circuit (not illustrated) included in the interface signal processing circuit 34.

The digital signal processing and controlling circuit 31 processes those signals in the interface signal processing circuit 34, and then, transmits a control signal to the panel section 32. The memory control circuit 36 transmits a memory control signal to the panel section 32, and the driver control circuit 37 transmits a driver control signal to the panel section 32.

The panel section 32 is comprised of a 50-size plasma display panel 50, a scanning driver 38 for driving a scanning electrode, data drivers 39 for driving data electrodes, pulse-generating circuits 40 for applying a pulse voltage to the plasma display panel 50 and the scanning driver 38, and a circuit 41 for collecting excess power from the pulse-generating circuits 40.

The plasma display panel 50 is designed to have 1365×768 pixels. In the plasma display panel 50, the scanning driver 38 controls a scanning electrode, and the data drivers 39 control data electrodes, thereby a light is emitted from selected display cells for displaying images.

A first power source supplies power to the digital signal processing and controlling circuit 31 and the panel section 32. A power source circuit 33 receives DC power from a second power source, converts a DC voltage into a desired voltage, and supplies the desired voltage to the panel section 32.

Hereinbelow is explained a method of fabricating the plasma display unit 60.

First, the plasma display panel 50, the scanning driver 38, the data drivers 39, the pulse-generating circuits 40, and the power-collecting circuit 41 are arranged on a substrate to thereby fabricate the panel section 32.

Apart from the panel section 32, there is fabricated the digital signal processing and controlling circuit 31.

The panel section 32, the digital signal processing and controlling circuit 31 and the power source circuit 33 are assembled as a module. Thus, the plasma display module 30 is completed.

Apart from the plasma display module 30, there is fabricated the analog interface 20.

After the plasma display module 30 and the analog interface 20 have been fabricated separately from each other, they are electrically connected to each other. Thus, there is completed the plasma display unit 60 illustrated in FIG. 5.

By modularizing the plasma display unit 60, the plasma display panel 50 can be fabricated independently of other parts constituting the plasma display unit 60. For instance, if the plasma display panel 50 went wrong in the plasma display unit 60, the plasma display module 30 including the plasma display panel 50 having gone wrong can be exchanged into new one, ensuring simplification in repair and reduction in time for repair.

Since the plasma display unit 60 includes the plasma display panel 50 having a blue-light emitting phosphor layer in accordance with one of the first to fifth embodiments and the examples 2 to 6 in the sixth embodiments, the plasma display unit 60 can suppress variation of a brightness with the lapse of time without reduction in an initial brightness with respect to emission of a blue light.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-349749 filed on Oct. 8, 2003 including specification, claims, drawings and summary is incorporated herein by reference in its entirety.

What is claimed is:

1. A plasma display panel comprising a first substrate facing a viewer, and a second substrate arranged in facing relation to said first substrate,
said first substrate being comprised of
a transparent substrate;
a scanning electrode and a common electrode both formed on said transparent substrate in facing relation to said second substrate; and
a dielectric layer covering said transparent substrate, said scanning electrode and said common electrode therewith,
said second substrate being comprised of
an electrically insulating substrate;
a plurality of data electrodes formed on said electrically insulating substrate;
a plurality of partition walls formed on said electrically insulating substrate; and
a phosphor layer covering said electrically insulating substrate and said data electrodes therewith between adjacent partition walls,
said phosphor layer including at least a blue-phosphor layer composed of phosphor which emits a blue light,
said blue-phosphor layer being composed of a mixture of two or more phosphors each of which emits a blue light and has an initial brightness and variation of brightness with the lapse of time both different from one another.

2. The plasma display panel as set forth in claim 1, wherein said blue-phosphor layer is composed of a mixture of first phosphor which emits a blue light and second phosphor which emits a blue light, said second phosphor having an initial brightness smaller than the same of said first phosphor, and smaller variation of brightness with the lapse of time than the same of said first phosphor.

3. The plasma display panel as set forth in claim 2, wherein said blue-phosphor layer includes said first phosphor in the range of 10 to 90 weight % both inclusive.

4. The plasma display panel as set forth in claim 1, wherein said blue-phosphor layer is composed of a mixture of at least one kind of first phosphor which emits a blue light and includes aluminate having bivalent europium ($Eu^{2+}$), and at least one kind of second phosphor which emits a blue light and includes silicate having bivalent europium ($Eu^{2+}$).

5. The plasma display panel as set forth in claim 4, wherein said blue-phosphor layer includes said first phosphor in the range of 10 to 90 weight % both inclusive.

6. The plasma display panel as set forth in claim 4, wherein said first phosphor is $BaMgAl_{10}O_{17}:Eu^{2+}$.

7. The plasma display panel as set forth in claim 4, wherein said second phosphor is $CaMgSi_2O_6:Eu^{2+}$.

8. The plasma display panel as set forth in claim 4, wherein said first phosphor is comprised of $BaMgAl_{10}O_{17}:Eu^{2+}$ and at least one kind of another phosphor which emits a blue light and includes aluminate having bivalent europium ($Eu^{2+}$).

9. The plasma display panel as set forth in claim 4, wherein said second phosphor is comprised of $CaMgSi_2O_6:Eu^{2+}$ and at least one kind of another phosphor which emits a blue light and includes silicate having bivalent europium ($Eu^{2+}$).

10. A plasma display unit including a plasma display panel as a display panel,
said plasma display panel comprising a first substrate facing a viewer, and a second substrate arranged in facing relation to said first substrate,
said first substrate being comprised of
a transparent substrate;
a scanning electrode and a common electrode both formed on said transparent substrate in facing relation to said second substrate; and
a dielectric layer covering said transparent substrate, said scanning electrode and said common electrode therewith,
said second substrate being comprised of
an electrically insulating substrate;
a plurality of data electrodes formed on said electrically insulating substrate;
a plurality of partition walls formed on said electrically insulating substrate; and a phosphor layer covering said electrically insulating substrate and said data electrodes therewith between adjacent partition walls, said phosphor layer including at least a blue-phosphor layer composed of phosphor which emits a blue light, said blue-phosphor layer being composed of a mixture of two or more phosphors each of which emits a blue light and has an initial brightness and variation of brightness with the lapse of time both different from one another.

11. The plasma display unit as set forth in claim 10, wherein said blue-phosphor layer is composed of a mixture of first phosphor which emits a blue light and second phosphor which emits a blue light, said second phosphor having an initial brightness smaller than the same of said first phosphor, and smaller variation of brightness with the lapse of time than the same of said first phosphor.

12. The plasma display unit as set forth in claim 11, wherein said blue-phosphor layer includes said first phosphor in the range of 10 to 90 weight % both inclusive.

13. The plasma display unit as set forth in claim 10, wherein said blue-phosphor layer is composed of a mixture of at least one kind of first phosphor which emits a blue light and includes aluminate having bivalent europium ($Eu^{2+}$), and at least one kind of second phosphor which emits a blue light and includes silicate having bivalent europium ($Eu^{2+}$).

14. The plasma display unit as set forth in claim 13, wherein said blue-phosphor layer includes said first phosphor in the range of 10 to 90 weight % both inclusive.

15. The plasma display unit as set forth in claim 14, wherein said first phosphor is $BaMgAl_{10}O_{17}:Eu^{2+}$.

16. The plasma display unit as set forth in claim 13, wherein said second phosphor is $CaMgSi_2O_6:Eu^{2+}$.

17. The plasma display unit as set forth in claim 13, wherein said first phosphor is comprised of $BaMgAl_{10}O_{17}:Eu^{2+}$ and at least one kind of another phosphor which emits a blue light and includes aluminate having bivalent europium ($Eu^{2+}$).

18. The plasma display unit as set forth in claim 13, wherein said second phosphor is comprised of $CaMgSi_2O_6:Eu^{2+}$ and at least one kind of another phosphor which emits a blue light and includes silicate having bivalent europium ($Eu^{2+}$).

19. A plasma display unit comprising:

an analog interface which converts a received analog image signal into a digital image signal, and outputs said digital image signal; and a plasma display module including a plasma display panel for outputting mages in accordance with said digital image signal received from said analog interface, said plasma display panel comprising a first substrate facing a viewer, and a second substrate arranged in facing relation to said first substrate, said first substrate being comprised of a transparent substrate;

a scanning electrode and a common electrode both formed on said transparent substrate in facing relation to said second substrate; and a dielectric layer covering said transparent substrate, said scanning electrode and said common electrode therewith, said second substrate being comprised of an electrically insulating substrate;

a plurality of data electrodes formed on said electrically insulating substrate;

a plurality of partition walls formed on said electrically insulating substrate; and a phosphor layer covering said electrically insulating substrate and said data electrodes therewith between adjacent partition walls, said phosphor layer including at least a blue-phosphor layer composed of phosphor which emits a blue light, said blue-phosphor layer being composed of a mixture of two or more phosphors each of which emits a blue light and has an initial brightness and variation of brightness with the lapse of time both different from one another.

20. The plasma display unit as set forth in claim 19, wherein said blue-phosphor layer is composed of a mixture of first phosphor which emits a blue light and second phosphor which emits a blue light, said second phosphor having an initial brightness smaller than the same of said first phosphor, and smaller variation of brightness with the lapse of time than the same of said first phosphor.

21. The plasma display unit as set forth in claim 20, wherein said blue-phosphor layer includes said first phosphor in the range of 10 to 90 weight % both inclusive.

22. The plasma display unit as set forth in claim 19, wherein said blue-phosphor layer is composed of a mixture of at least one kind of first phosphor which emits a blue light and includes aluminate having bivalent europium ($Eu^{2+}$), and at least one kind of second phosphor which emits a blue light and includes silicate having bivalent europium ($Eu^{2+}$).

23. The plasma display unit as set forth in claim 22, wherein said blue-phosphor layer includes said first phosphor in the range of 10 to 90 weight % both inclusive.

24. The plasma display unit as set forth in claim 22, wherein said first phosphor is $BaMgAl_{10}O_{17}:Eu^{2+}$.

25. The plasma display unit as set forth in claim 22, wherein said second phosphor is $CaMgSi_2O_6:Eu^{2+}$.

26. The plasma display unit as set forth in claim 22, wherein said first phosphor is comprised of $BaMgAl_{10}O_{17}:Eu^{2+}$ and at least one kind of another phosphor which emits a blue light and includes aluminate having bivalent europium ($Eu^{2+}$).

27. The plasma display unit as set forth in claim 22, wherein said second phosphor is comprised of $CaMgSi_2O_6:Eu^{2+}$ and at least one kind of another phosphor which emits a blue light and includes silicate having bivalent europium ($Eu^{2+}$).

* * * * *